(12) United States Patent
Benisty et al.

(10) Patent No.: US 10,521,118 B2
(45) Date of Patent: Dec. 31, 2019

(54) METHODS, SYSTEMS, AND COMPUTER READABLE MEDIA FOR WRITE CLASSIFICATION AND AGGREGATION USING HOST MEMORY BUFFER (HMB)

(71) Applicant: SanDisk Technologies LLC, Plano, TX (US)

(72) Inventors: Shay Benisty, Beer Sheva (IL); Tal Sharifie, Lehavim (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 298 days.

(21) Appl. No.: 15/209,739

(22) Filed: Jul. 13, 2016

(65) Prior Publication Data

US 2018/0018101 A1  Jan. 18, 2018

(51) Int. Cl.
*G06F 3/06* (2006.01)
(52) U.S. Cl.
CPC .......... *G06F 3/0608* (2013.01); *G06F 3/0616* (2013.01); *G06F 3/0656* (2013.01); *G06F 3/0659* (2013.01); *G06F 3/0665* (2013.01); *G06F 3/0679* (2013.01)
(58) Field of Classification Search
CPC .... G06F 3/0608; G06F 3/0616; G06F 3/0656; G06F 3/0659; G06F 3/0665; G06F 3/0679
See application file for complete search history.

(56) References Cited

U.S. PATENT DOCUMENTS

| 5,283,882 | A | * | 2/1994 | Smith | G06F 12/1063 365/49.1 |
| 5,293,603 | A | * | 3/1994 | MacWilliams | G06F 12/0804 711/117 |
| 5,584,009 | A | * | 12/1996 | Garibay, Jr. | G06F 9/30043 711/117 |
| 7,743,038 | B1 | | 6/2010 | Goldick | |

(Continued)

OTHER PUBLICATIONS

"NVM Express," Specification Revision 1.2.1, http://www.nvmexpress.org/wp-content/uploads/NVM_Express_1_2_1_Gold_20160603.pdf, pp. 1-217 (Jun. 5, 2016).

(Continued)

*Primary Examiner* — Mano Padmanabhan
*Assistant Examiner* — Andrew J Cheong
(74) *Attorney, Agent, or Firm* — Loza & Loza, LLP; Gabriel Fitch

(57) ABSTRACT

A method for write aggregation using a host memory buffer includes fetching write commands and data specified by the write commands from a host over a bus to a non-volatile memory system coupled to the host. Writing the data specified by the write commands from the non-volatile memory system over the bus to the host. The method further includes aggregating the data specified by the write commands in a host memory buffer maintained in memory of the host. The method further includes determining whether the data in the host memory buffer has aggregated to a threshold amount. The method further includes, in response to determining that the data has aggregated to the threshold amount, reading the (Continued)

data from the host memory buffer to the non-volatile memory system and writing the data to non-volatile memory in the non-volatile memory system.

17 Claims, 8 Drawing Sheets

(56) References Cited

U.S. PATENT DOCUMENTS

| | | | |
|---|---|---|---|
| 7,937,393 B2 | 5/2011 | Prahlad et al. | |
| 8,775,741 B1 | 7/2014 | de la Iglesia | |
| 8,949,555 B1* | 2/2015 | Karamcheti | G06F 12/0246 711/158 |
| 9,250,687 B1* | 2/2016 | Aswadhati | G06F 1/3225 |
| 2002/0124129 A1* | 9/2002 | Zilberman | G06F 13/1673 711/103 |
| 2003/0188184 A1 | 10/2003 | Strongin et al. | |
| 2006/0106984 A1 | 5/2006 | Bartley et al. | |
| 2008/0250195 A1* | 10/2008 | Chow | G06F 12/0246 711/103 |
| 2008/0320211 A1 | 12/2008 | Kinoshita | |
| 2009/0031083 A1 | 1/2009 | Willis et al. | |
| 2009/0113119 A1* | 4/2009 | Oribe | G06F 12/0804 711/103 |
| 2009/0172247 A1* | 7/2009 | Bar-Or | G11C 16/10 711/103 |
| 2009/0228875 A1 | 9/2009 | DeVries | |
| 2010/0146193 A1* | 6/2010 | Jang | G06F 12/0804 711/103 |
| 2010/0262721 A1 | 10/2010 | Asnaashari et al. | |
| 2011/0099323 A1* | 4/2011 | Syu | G06F 12/0246 711/103 |
| 2011/0296088 A1 | 12/2011 | Duzly et al. | |
| 2011/0320685 A1 | 12/2011 | Gorobets et al. | |
| 2012/0051137 A1 | 3/2012 | Hung et al. | |
| 2012/0144092 A1 | 6/2012 | Hsieh et al. | |
| 2012/0284587 A1 | 11/2012 | Yu et al. | |
| 2012/0317335 A1 | 12/2012 | Cho | |
| 2013/0080732 A1 | 3/2013 | Nellans et al. | |
| 2013/0086311 A1 | 4/2013 | Huang et al. | |
| 2013/0138867 A1 | 5/2013 | Craft et al. | |
| 2013/0262533 A1 | 10/2013 | Mitra et al. | |
| 2013/0275672 A1 | 10/2013 | Bert | |
| 2013/0297852 A1 | 11/2013 | Fai et al. | |
| 2013/0332558 A1* | 12/2013 | Condict | G06F 3/0641 709/214 |
| 2013/0339573 A1* | 12/2013 | Anderson | G06F 12/08 711/103 |
| 2014/0149641 A1 | 5/2014 | Avila et al. | |
| 2014/0281132 A1* | 9/2014 | Bundukin | G06F 12/0246 711/103 |
| 2014/0289492 A1 | 9/2014 | Ranjith Reddy et al. | |
| 2014/0337560 A1 | 11/2014 | Chun et al. | |
| 2015/0026509 A1* | 1/2015 | Zhang | G06F 13/4059 714/6.11 |
| 2015/0081979 A1* | 3/2015 | Banta | G06F 12/0804 711/135 |
| 2015/0089152 A1* | 3/2015 | Busaba | G06F 12/0831 711/141 |
| 2015/0134857 A1* | 5/2015 | Hahn | G06F 3/061 710/5 |
| 2015/0199269 A1 | 7/2015 | Bert et al. | |
| 2015/0356020 A1 | 12/2015 | Desai et al. | |
| 2015/0378605 A1* | 12/2015 | Huang | H04L 67/1004 711/103 |
| 2016/0026406 A1 | 1/2016 | Hahn et al. | |
| 2016/0054931 A1 | 2/2016 | Romanovsky | |
| 2016/0054934 A1 | 2/2016 | Hahn et al. | |
| 2016/0132237 A1* | 5/2016 | Jeong | G06F 3/061 711/103 |
| 2016/0132392 A1* | 5/2016 | Ioannou | G06F 3/0619 714/766 |
| 2016/0147671 A1* | 5/2016 | Vishne | G06F 12/12 711/135 |
| 2017/0031811 A1* | 2/2017 | Fu | G06F 12/0246 |
| 2017/0177233 A1* | 6/2017 | Delaney | G06F 3/065 |
| 2017/0177276 A1* | 6/2017 | Delaney | G06F 3/0656 |
| 2017/0364266 A1* | 12/2017 | Xu | G06F 3/061 |

OTHER PUBLICATIONS

Notice of Allowance and Fees Due for U.S. Appl. No. 14/297,563 (dated Jul. 25, 2016).

Non-Final Office Action for U.S. Appl. No. 14/555,548 (dated Jul. 5, 2016).

Final Office Action for U.S. Appl. No. 14/464,584 (dated Apr. 26, 2016).

Final Office Action for U.S. Appl. No. 14/297,563 (dated Apr. 13, 2016).

Non-Final Office Action for U.S. Appl. No. 14/814,460 (dated Mar. 28, 2016).

Commonly-assigned, co-pending U.S. Appl. No. 14/977,559 for "Methods, Systems, and Computer Readable Media for Automatically and Selectively Enabling Burst Mode Operation in a Storage Device," (Unpublished, filed Dec. 21, 2015).

Non-Final Office Action for U.S. Appl. No. 14/297,563 (dated Dec. 4, 2015).

Non-Final Office Action for U.S. Appl. No. 14/464,584 (dated Dec. 4, 2015).

Commonly-assigned, co-pending U.S. Appl. No. 14/814,460 for "Methods, Systems, and Computer Readable Media for Providing Flexible Host Memory Buffer," (Unpublished, filed Jul. 30, 2015).

Commonly-assigned, co-pending U.S. Appl. No. 14/555,548 for "Storage Devices and Methods for Optimizing Use of Storage Devices Based on Storage Device Parsing of File System Metadata in Host Write Operations" (Unpublished, filed Nov. 26 2014).

"Ext4 Disk Layout," https://ext4.wiki.kernel.org/index.php/Ext4_Disk_Layout, Wikipedia, pp. 1-28 (Nov. 17, 2014).

Commonly-assigned, co-pending U.S. Appl. No. 14/297,563 for "Methods, Systems, and Computer Readable Media for Solid State Drive Caching Across a Host Bus," (Unpublished, filed Jun. 5, 2014).

"NVM Express Overview," NVM Express, pp. 1-2 (copyright 2013).

"CreateFile function," Microsoft, Windows Dev Center, https://msdn.microsoft.com/en-us/library/windows/desktop/aa363858(v=vs.85).aspx, pp. 1-20 (2008).

"NVM Express," Specification Revision 1.2, http://nvmexpress.org/wp-content/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4 (Jan. 14, 2013).

Prabhakaran et al., "Analysis and Evolution of Journaling File Systems," 2005 USENIX Annual Technical Conference, pp. 105-120 (2005).

"Understanding the Flash Translation Layer (FTL) Specification," AP-684 Application Note, Intel, pp. 1-20 (Dec. 1998).

\* cited by examiner

METHODS, SYSTEMS, AND COMPUTER READABLE MEDIA FOR WRITE CLASSIFICATION AND AGGREGATION USING HOST MEMORY BUFFER (HMB)

TECHNICAL FIELD

The subject matter described herein relates to aggregating data for write commands written by a host to a non-volatile storage device. More particularly, the subject matter described herein includes method, systems, and computer readable media for write classification and aggregation using a host memory buffer.

BACKGROUND

When writing data to non-volatile storage devices, the smallest unit of data that can be written by the host is governed by logical block addressing and is typically 512 bytes or 4 kilobytes. In contrast, the smallest unit of data that can be written to flash memory governed by a page size and is typically 16 kilobytes or 32 kilobytes. Thus, if a host device writes 4 kilobytes of data to a non-volatile storage device with flash memory with a 32 kilobyte page size, there is a 28 kilobyte difference in minimum write granularity.

One mechanism for dealing with the difference in minimum write granularity is to pad writes from the host that are smaller than the minimum flash write granularity with padding (typically zeros) and write the data and the padding to the flash memory. Performing such padding is undesirable as it wastes storage space in the flash memory and also increases wear on flash memory cells.

In light of the disadvantages associated with padding each write, aggregation of data to be written to flash memory has been performed using dynamic random access memory (DRAM) on the storage device, which is sometimes referred to as coupled DRAM. In such a scenario, when a host device writes data to the non-volatile storage device, and the amount of data from individual write commands is less than the page size of the flash memory, data from multiple write commands is aggregated in DRAM on the non-volatile storage device until a page size of data is received. When a page size of data is aggregated, the data is transferred from the DRAM on the non-volatile storage device to the flash memory. One problem with this implementation is that it requires additional DRAM on the non-volatile storage device. If such DRAM is a limited resource or is not available, such aggregation on the non-volatile storage device cannot be performed.

BRIEF DESCRIPTION OF THE DRAWINGS

The subject matter described herein will now be explained with reference to the accompanying drawings of which.

DETAILED DESCRIPTION

Figure 1A:
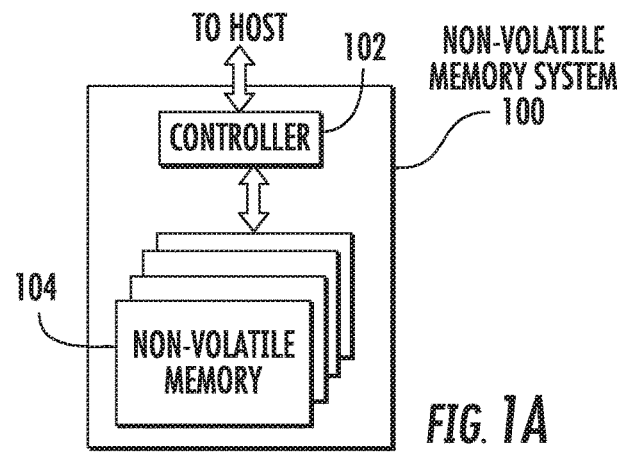
FIGS. 1A through 1C illustrate examples of non-volatile memory systems in which the subject matter described herein may be implemented.

The subject matter described herein includes method, systems, and computer media for write classification and aggregation using the host memory buffer. The host memory buffer allows the controller of a storage device to use a designated portion of host memory for storing storage device data. The designated memory resources allocated on the host are for the exclusive use of the storage device controller. Host software should not modify ranges of addresses allocated for the host memory buffer without first requesting that the storage device controller release the ranges. The storage device controller is responsible for initializing the host memory resources for the host memory buffer. According to the NVMe specification (see, e.g., NVM Express, Revision 1.2.1, Jun. 5, 2016, the disclosure of which is incorporated herein by reference in its entirety), the host memory buffer has the following features:

1. Allocated for the controller's exclusive use.
2. Data is guaranteed to be valid.
3. The host is obliged to notify the controller before any operation (e.g. in case of power loss or in the case the host might need this buffer, etc.) which might lead to data loss. In such cases, the host must permit the controller to acknowledge the operation before the data is lost.

As stated above, host read and write commands, such as NVMe read and write commands, work in the granularity of logical block address (LBA) size. On the other hand, write granularity to a flash memory device is defined as a page size or multipage size in the case of multi-plane memory configurations. In most cases, write granularity to the flash memory is not equal to the LBA size and is greater than the LBA size. For example, write granularity to the flash may be 32 kilobytes while the LBA size is 512 bytes.

In terms of flash efficiency and endurance, it is better to aggregate the data that comes from different write commands before writing the data to the flash rather than writing a small chunk of data with padding after each write command. For example, if the host sends eight random write commands each of size 4 kilobytes and the flash page size is 32 kilobytes, the table shown below illustrates two flows that might be implemented for this sequence of eight write commands:

TABLE 1

Example Write Command Implementations With and Without Padding

|  | Write #1 | Write #2 | Write #3 | Write #4 | Write #5 | Write #6 | Write #7 | Write #8 |
|---|---|---|---|---|---|---|---|---|
| With Padding | Write data with padding to flash | Write data with padding to flash | Write data with padding to flash | Write data with padding to flash | Write data with padding to flash | Write data with padding to flash | Write data with padding to flash | Write data with padding to flash |
| Without Padding | Aggregate Data | Aggregate Data | Aggregate Data | Aggregate Data | Aggregate Data | Aggregate Data | Aggregate Data | Write aggregated data to flash |

In Table 1 above, the first row below the table header shows the addition of padding to each write command to make up for the difference between the LBA size of 4 kilobytes and the flash page size of 32 kilobytes. In such an implementation, the padding would be 28 kilobytes per write command, which is inefficient. In the second row of Table 1, random write commands may be aggregated until a sufficient amount of data is received to perform a write to the flash. In this example, eight write commands of 4 kilobytes each are received before a page size of 32 kilobytes is received, and a single write to the flash is performed after the eighth write command.

The implementation in the second row of Table 1 is better in terms of flash efficiency and endurance but it requires memory (conventionally DRAM on the non-volatile storage device) for aggregating user data. The extra memory is required to cache the data for a write command when posting a completion message to the host after each host write command and before the writing of the data to the flash. If the device posts the completion commands to the host after the writing to the flash, this will result in additional latency perceived by the host.

According to the subject matter described herein, the host memory buffer on the host side of the peripheral component interconnect express (PCIe) bus is used to aggregate data from host write commands until a threshold amount of data, such as one or more pages of data, is aggregated in the host memory buffer. When the threshold amount of data is reached, the aggregated data is written from the host memory buffer to the flash memory. Completion commands may be posted by the device controller in host completion queues after storing the data for each write command in the host memory buffer. Posting the completion commands in the host completion queues after writing the data to the host memory buffer but before writing the data to the flash memory results in less perceived latency from the host point of view. However, if a read command is received from the host for data that is stored in the host memory buffer but not yet stored in the flash memory, this is referred to herein as a collision. The subject matter described herein may deal with such a collision by satisfying the read command with data directly from the host memory buffer, as will be described in more detail below.

Figure 1B:
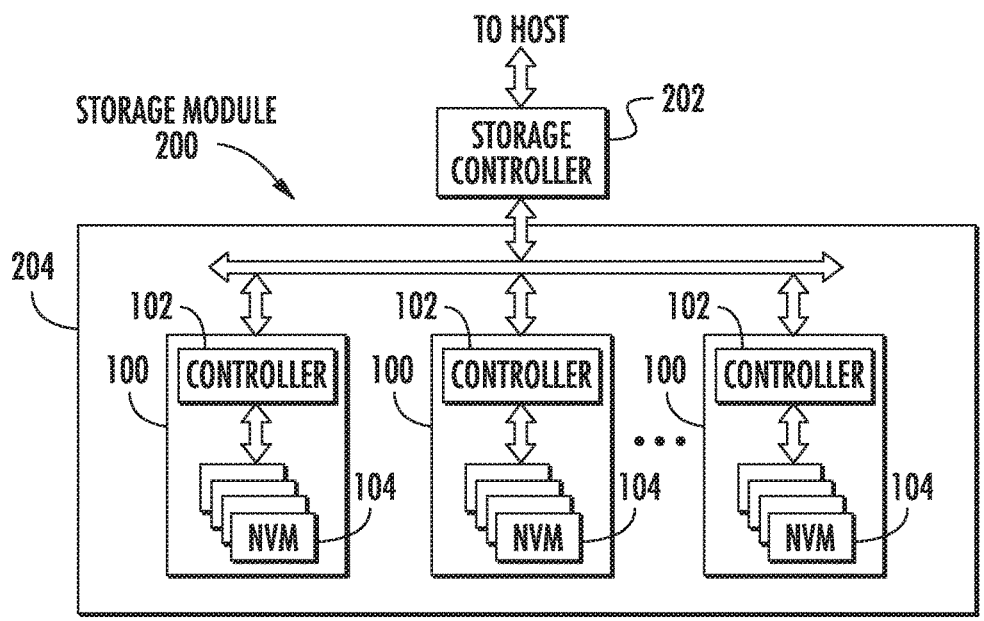
Figure 1C:
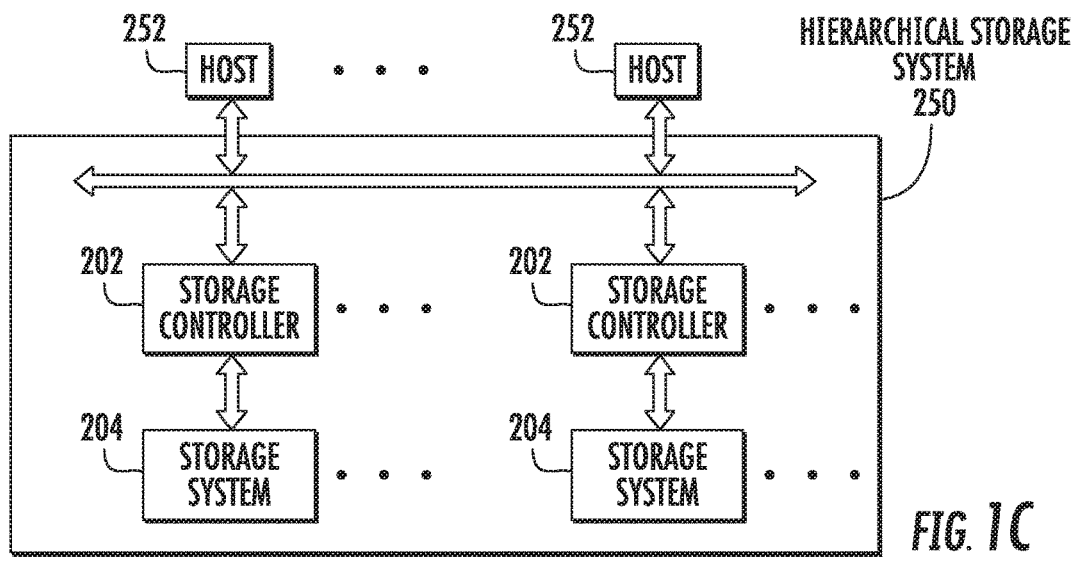

FIGS. 1A through 1C illustrate exemplary operating environments for write caching using a host memory buffer according to an embodiment of the subject matter described herein.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Although in the example illustrated in FIG. 1A, the non-volatile memory system 100 may include a single channel between the controller 102 and the non-volatile memory die(s) 104, the subject matter described herein is not limited to having a single memory channel. For example, in some NAND memory system architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

In FIG. 1B, a storage module 200 includes a storage controller 202 that communicates with a storage system 204 having a plurality of storage devices 100. The interface between the storage controller 202 and the non-volatile memory system 100 may be a bus interface, such as a serial advanced technology attachment (SATA) interface, a peripheral component interface (PCIe) interface, an embedded MultiMediaCard (eMMC) interface, a SD interface, or a Universal Serial Bus (USB), as examples. In such a system, storage controller 202 may allocate different portions of a host memory buffer for each storage device 100, and each storage device 100 may perform write caching using the host memory buffer as described herein. The storage module 200, in one embodiment, may be a solid state drive (SSD), such as found in portable computing devices, such as laptop computers and tablet computers and mobile phones.

FIG. 1C illustrates a hierarchical storage system 250 that provides memory storage services for a plurality of host systems 252. Hierarchical storage system 250 includes plural storage controllers 202 that control access to storage systems 204. In such a system, write caching using a host memory buffer may be implemented by each storage controller 202 and the host or hosts with which he storage controller 202 interacts. Host systems 252 may access memories within the hierarchical storage system 250 via a bus interface. Example bus interfaces may include a non-volatile memory express (NVMe) interface, a Fiber Channel over Ethernet (FCoE) interface, an SD interface, a USB interface, a SATA interface, a PCIe interface, or an eMMC interface as examples. In one embodiment, the storage system 250 illustrated in FIG. 1C may be a rack mountable mass storage system that is accessible by multiple host computers, such as would be found in the data center or other locations where mass storage is needed.

Figure 2:
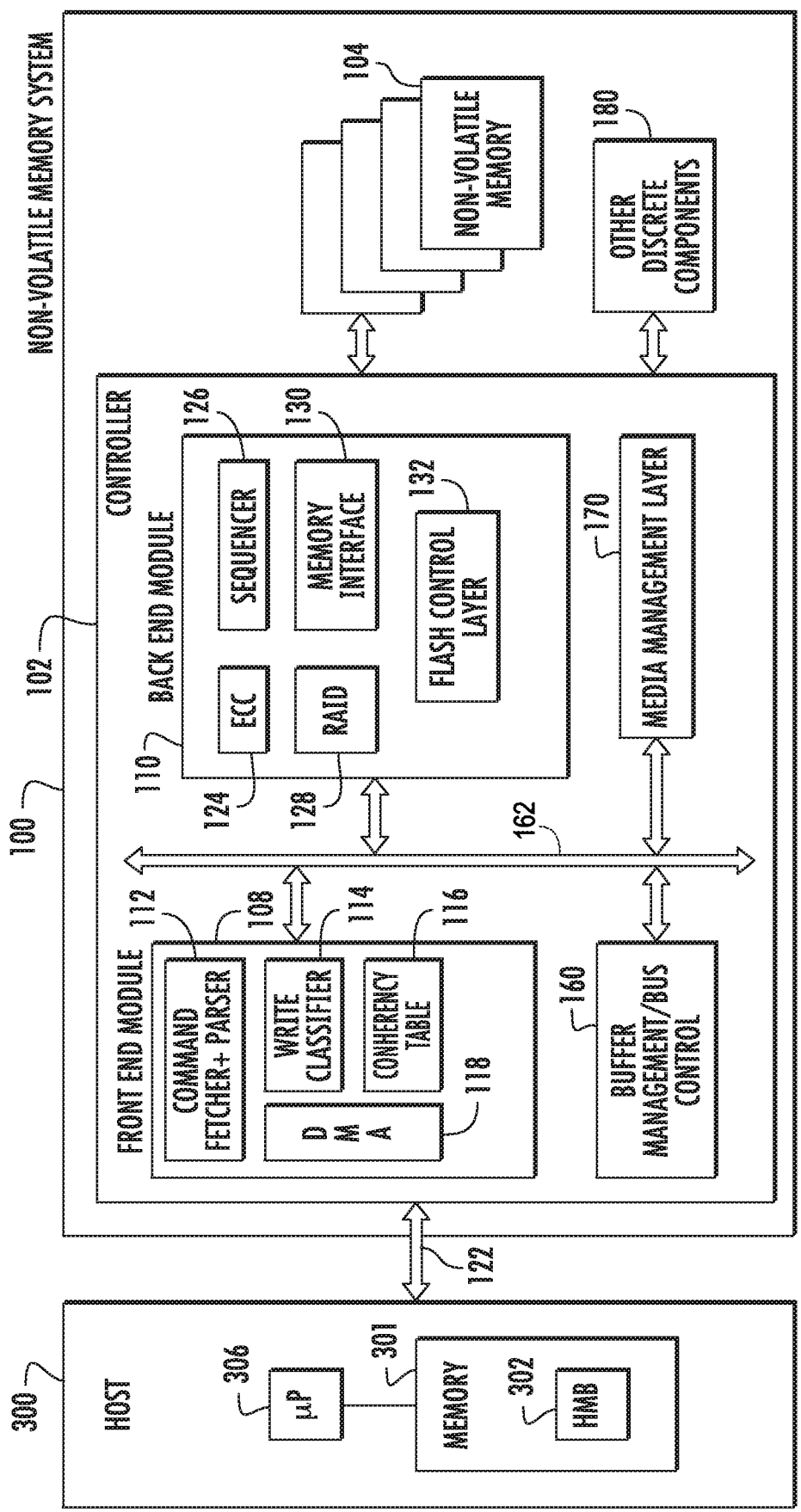
FIG. 2 is a block diagram of a host device and a non-volatile storage device illustrating an exemplary environment in which write classification and aggregation using a host memory buffer can be performed.

FIG. 2 is a block diagram illustrating exemplary components of a non-volatile memory storage system 100 that implements write caching using a host memory buffer according to an embodiment of the subject matter described herein. Referring to FIG. 2, controller 102 includes a front end module 108 and a back end module 110. Front end module 108 includes components that interface with a host 300. In the illustrated example, these components include a command fetcher and parser 112, a write classifier 114, a coherency table 116, and a direct memory access (DMA) controller 118. Command fetcher and parser 112 fetches commands, such as read and write commands, from host 300. Write classifier 114 classifies host write operations as random, sequential, or other suitable classifications. Coherency table 116 maintains listing of logical block addresses for data that is stored in host memory buffer 302. DMA controller 118 allows the caching of data for host write operations in host memory buffer 302 without impacting back end module 110.

In the illustrated example, non-volatile memory system 100 is connected to host 300 via a bus 122. Bus 122 may be any suitable bus that allows controller 102 to reserve and utilize a portion of host memory 301 for caching write operations. In one example, bus 122 may be a PCIe bus, and the protocol that allows controller 102 to cache data from write operations in host memory buffer 302 is the non-volatile memory express protocol. However, the subject matter described herein is not limited to the non-volatile memory express protocol. Any protocol that allows a memory or storage controller to be a bus master and cache data over the bus to the host memory is intended the within the scope of the subject matter described herein.

Back end module 110 includes error correction controller (ECC) 124 that corrects errors in data written to the non-volatile memory 104. Back end module 110 further includes a sequencer 126 but sequences read and write operations to non-volatile memory 104. Back end module 110 further includes a redundant array of inexpensive disks (RAID) interface 128 that allows non-volatile memory 104 to operate as a RAID system. Back end module 110 further includes a memory interface 130 that interfaces with non-volatile memory 104. Back end module 110 further includes a flash controller 132 that performs flash control and maintenance operations, such as garbage collection and wear leveling.

Controller 102 further includes buffer management and bus controller 160 that controls communications over internal bus 162 between front end module 108 and back end module 110. Controller 102 further includes a media management layer 170 that performs media management operations. In addition to communicating with non-volatile memory 104, controller 102 may also communicate with other discrete components 180, which may include other controllers and/or non-volatile memory systems.

In the illustrated example, host device 300 includes host memory 301 in which host memory buffer 302 is implemented. Host 300 also includes one or more microprocessors 306 that control the overall operation of host device 300. Host device 300 may be any computing platform that includes one or more processors and memory subsystems and that communicates with a non-volatile memory system 100. For example, host device 300 may be a carrier grade or retail grade computing device that interfaces with a flash based storage system and operates as a self-contained or network accessible computing environment. Host device 300 may be any of a mobile device, a personal computer, a server, a cloud computer, a large/hyper scale storage appliance, or any combination thereof.

Non-volatile memory system 100 may be a flash memory based storage system that is either removable or imbedded within host device 300. For example, non-volatile memory system 100 may be implemented in any of the example systems illustrated in FIGS. 1A-1C.

In operation, DMA controller 118 may receive data from buffers in host memory 301 and write the data to host memory buffer 302 without impacting back end module 110. Command fetcher and parser 112 may fetch commands from host 300 over bus 122 and parse the commands to identify the command types (e.g. read or write). Write classifier 114 classifies write commands as sequential, random, or long. Coherency table 116 is used for tracking LBA ranges for data that is aggregated in HMB 302 to avoid coherency issues. For example, coherency table 116 may maintain coherency data, such as LBA ranges for data stored in HMB 302.

Because there may be more than one type of write operation that may be classified by write classifier 114, controller 102 may implement different aggregation queues for aggregating data for the different write classes. For example, device controller 102 may implement a random write buffer for aggregating data for random write operations, a sequential write buffer for aggregating data for sequential write operations, and a long write buffer for aggregating data for long write operations. It is better not to mix data from different write command types in order to simplify subsequent read operations that may occur. Each aggregation queue may be used for data accumulation until a threshold, such as a full flash page, is accumulated and then a single write operation may be performed to write the data from host memory buffer 302 to non-volatile memory 104.

When obtaining write commands from host 300, the following steps may be performed by controller 102:

1. Controller 102 may fetch the write command and then parse the write command. The fetching and parsing may be performed by command fetcher and parser 112. Read and write commands are stored in work queues, referred to as submission queues, in host memory 301. Fetching a command involves reading the command from a host submission queue over bus 122. Parsing the commands includes reading the command opcode to identify the command type and reading the LBA ranges in the command to identify the address ranges of data specified by the command.

2. Controller 102 may classify the write command based on one or more parameters, such as command size and command stream. This step may be performed by write classifier 114.

3. After classifying the write command, controller 102 may write the data from the write command to one of the aggregation queues in HMB 302. This may be performed by reading the data from host memory 301 across bus 112 to non-volatile memory system 100 and then writing the data back to host memory buffer 302. This process may be repeated until all the data in the write command has been stored in host memory buffer 302.

4. After writing the command data to the host memory buffer controller 102 may post a completion entry in the completion queue in host memory 301. The completion entry may be posted even though the data is not physically stored in non-volatile memory system 100. This step may be implemented when the host allows this feature using the force unit access (FUA) bit within the write command.

In parallel with the writing of data from a write command into host memory buffer 302, controller 102 may calculate the amount of data in each accumulation queue stored in host memory buffer 302. When the size of one of the aggregation queues crosses a flash page size, the data is read from the aggregation queue and written to non-volatile memory 104.

Figure 3:
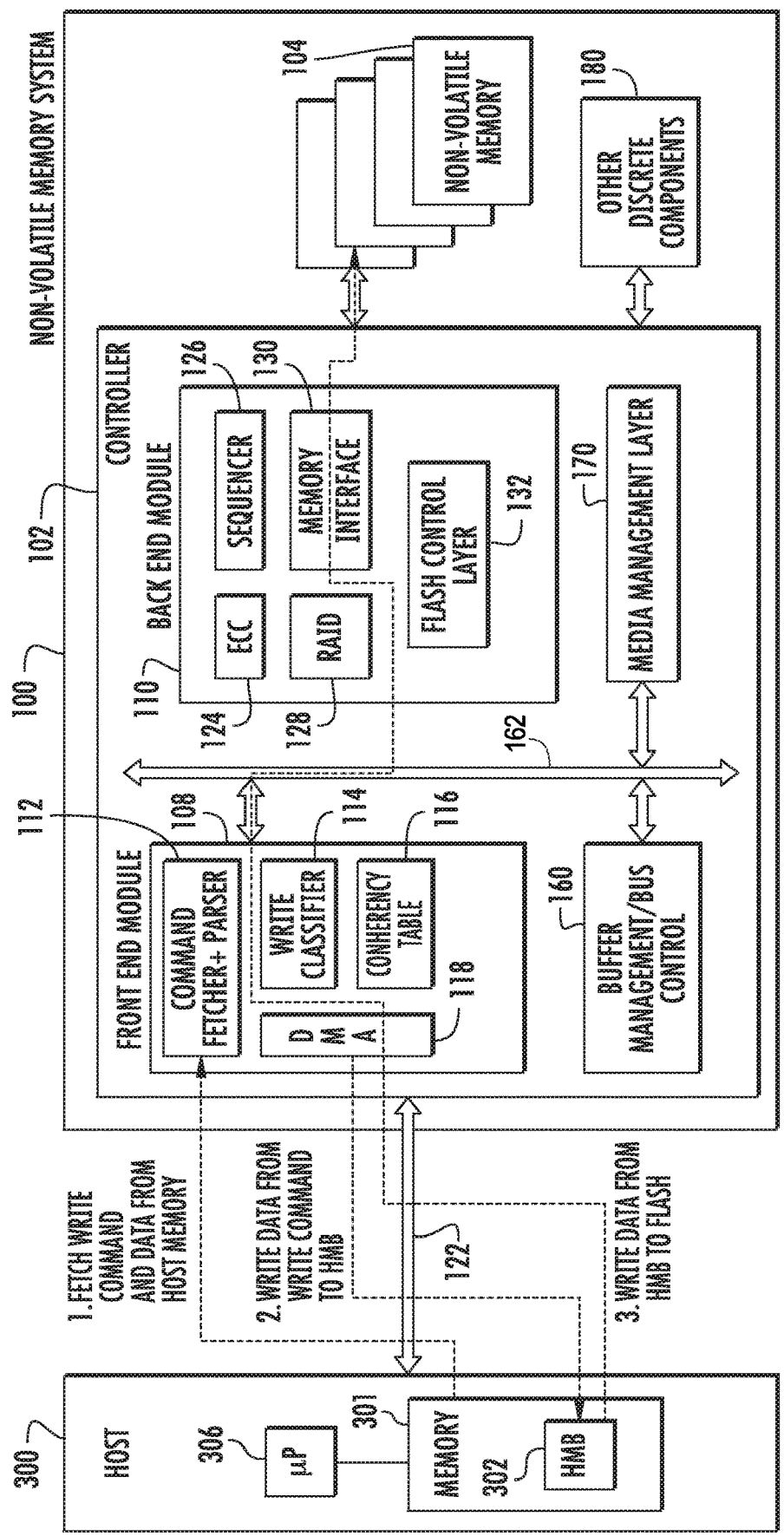
FIG. 3 is a block diagram of a host device and a non-volatile storage device illustrating write classification and aggregation using a host memory buffer.

FIG. 3 illustrates the flow of data associated with accumulation of write commands and writing to flash memory. Referring to FIG. 3, in step 1, controller 102 retrieves a write command from host 300 and reads the corresponding data across bus 122 to DMA controller 118. DMA controller 118, in step 2, writes the data to the appropriate aggregation queue. In step 3, when the aggregation queue contains enough data to satisfy a flash page size, controller 102 fetches the data from the aggregation queue in HMB 302 and writes the data to non-volatile memory 104.

As stated above, when data is written to host memory buffer 302, controller 102 updates coherency table 116 to indicate the LBA ranges that are maintained the host memory buffer 302. In addition, when data is written from HMB 302 to non-volatile memory 104, controller 102 removes the corresponding LBA ranges from coherency table 116.

One difference between write aggregation on a system with HMB and caching using DRAM is PCIe bandwidth. In the case of an aggregating operation on a coupled DRAM, the storage device just fetches the data from host memory over the PCIe bus and no more PCIe traffic is required for execution of the command. All other traffic is directed to the coupled DRAM. On the other hand, when using the HMB for write aggregation, the device first fetches the data through the PCIe bus. Then the storage device writes the data to the HMB through the PCIe bus. Finally, when writing the data to the flash, the data is transferred again over the PCIe bus. Table 2 shown below summarizes the amount of data transferred over the PCIe bus in both cases. The data that is transferred over the PCIe bus is tripled when using the HMB for write caching.

TABLE 2

PCIe Traffic using HMB Write Caching vs. DRAM Write Caching

| | Coupled DRAM Write Caching | HMB Write Caching |
|---|---|---|
| Data Read over PCIe Bus | x | 2x |
| Data Written over PCIe Bus | 0 | x |

In Table 2, the first row after the header illustrates the amount of read data transmitted over the PCIe bus for coupled DRAM write caching and HMB write caching. The second row indicates PCIe bus utilization for data writes. In Table 2, the variable "x" represents an amount of data to be written to flash memory. For coupled DRAM write caching, data is only transferred over the PCIe bus once, i.e., when the data is read from host memory, across the PCIe bus to the storage device. The data is then cached in the DRAM on the storage device, aggregated until enough data is present to write a full page, and then the data is written from the coupled DRAM to the flash memory in a single write operation without traversing the PCIe bus. For write caching using the HMB, data is initially read over the PCIe bus to the storage device, written from the storage device over the PCIe bus to the HMB, and read from the HMB to the storage device for writing to flash memory. Thus, for HMB caching, the data traverses the PCIe bus three times versus once for coupled DRAM caching. In light of the additional utilization of the PCIe bus, the subject matter described herein includes several optimizations to implement write caching using the host memory buffer. Exemplary optimizations will be described below.

1. Host Interface DMA Operation

Figure 4:
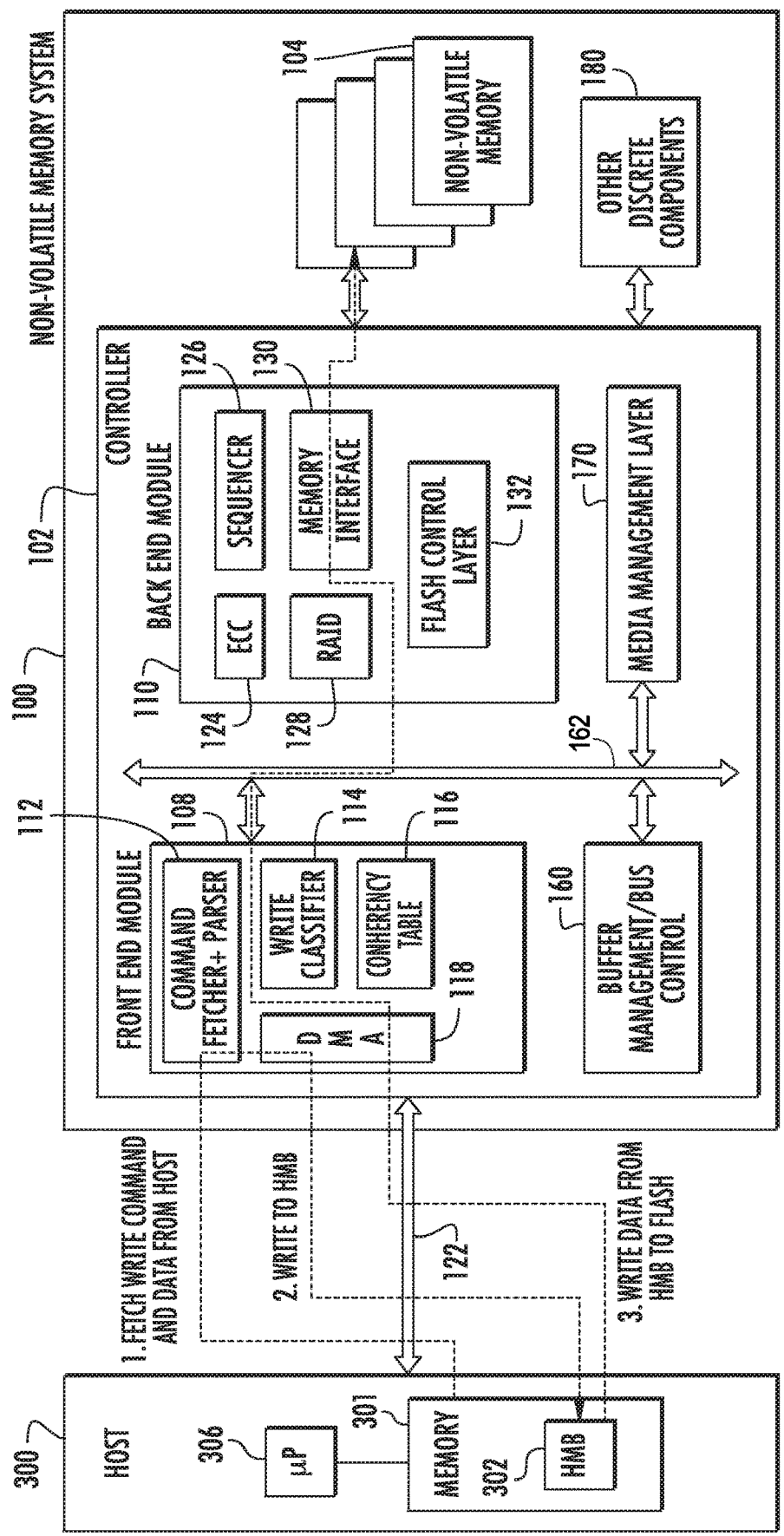
FIG. 4 is block diagram of a host device and a non-volatile storage device illustrating aggregation of data in the host memory buffer using a direct memory address (DMA) controller on the storage device to write the data from the storage device to the host memory buffer.

In order to use the PCIe more efficiently for write caching using the HMB, in one embodiment, the DMA controller closes the loop on reads from host memory and writes to the HMB with no interaction with the back end of the storage device. This operation is illustrated in FIG. 4. In FIG. 4, DMA controller 118 fetches the data specified by a write command from the host and writes the data in parallel to the fetching of the data to host memory buffer 302. The parallel reading and writing of the data is possible because the PCIe bus is a full-duplex communication medium. Back end components of non-volatile memory system 100, such as back end module 110, and non-volatile memory 104, are not affected by the fetching or writing of the data.

Benefits of fetching the data from write commands in parallel with writing the data to HMB 302 using the DMA controller include:

a) PCIe bandwidth—PCIe bandwidth is used more efficiently by taking advantage of the full-duplex capability of the PCIe bus.

b) Area—Because data is written HMB 302 in parallel with the fetching of data from host memory 301, less buffer space is required in non-volatile memory system 100 to buffer data before it is written to non-volatile memory 104.

c) Simplification of the back end—back end components of non-volatile memory system 100 are simplified because they do not interact with host device 300 during the aggregation of data into host memory buffer 302.

2. Ordering of Read and Write to HMB and Read From HMB

The NVMe specification does not specify ordering rules between read and write commands. However, when implementing writes aggregation using the HMB and coupled DRAM or other storage on non-volatile memory system 100 is limited, it is more efficient to execute commands in a specified order. An exemplary ordering algorithm may utilize PCIe bus resources efficiently and also releases HMB resources after writing accumulated data to flash memory.

Since the PCIe bus is full duplex, read and write operations can be executed in parallel. PCIe read transfers are required for host write commands in two scenarios. The first scenario is when reading from host data buffers specified in the host write command and the second is when reading data from the HMB just before writing it to non-volatile memory 104. PCIe write operations are required in two scenarios. The first scenario is for host read commands and the other is for host write commands when updating the HMB.

As explained above, reading from host data buffers and writing to the HMB may be performed in parallel. Similarly, the transfer of data from the storage device for host read commands and reading from the HMB can be executed in parallel. As a result, one ordering algorithm that may be used is summarized below:

a) Reading data from HMB 302 (just before writing to flash) is performed in parallel with the transfer of data from the storage device to satisfy host read commands. The reading from HMB 302 and the transfer of data from the storage device to satisfy host read commands may be given a first or highest level priority.

b) Reading data from host buffers for host write commands and writing the data to the HMB may also be executed in parallel. These transfers may be given a lower priority than reading data from the HMB in parallel with transferring data from the storage device to satisfy host read commands.

Operations may be executed according to these priorities, i.e., reading from the HMB and the transfer of data from the storage device to satisfy host read commands may have priority over reading from the host buffers and writing to the HMB. In other words, in such a system, read commands from the host should be given higher priority over write commands from the host in order to increase the overall performance and increase PCIe efficiency.

3. Read-Write Collision

As stated above, a read-write collision may occur when the host attempts to read data that is maintained in the HMB but has not been written to flash memory. In such a case, device controller 102 may satisfy the read command by providing data directly from the host memory buffer without first writing the data to non-volatile memory 104.

Figure 5A:
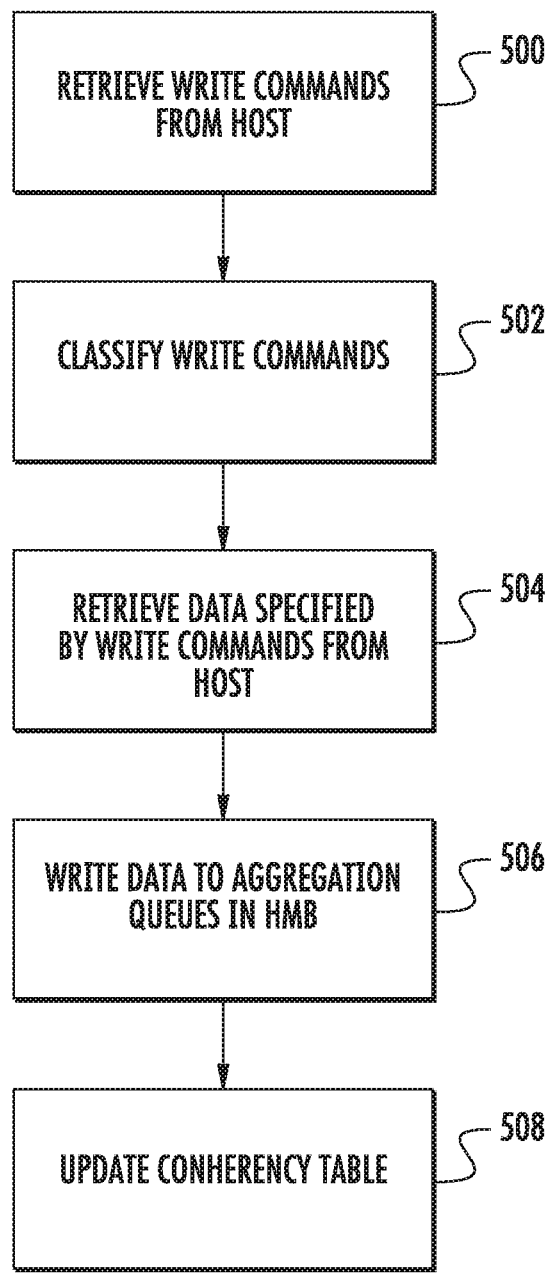
FIG. 5A is a flow chart illustrating an exemplary process for classifying writes and aggregating data in a host memory buffer.

FIG. 5A is a flow chart illustrating an exemplary process for implementing write caching using HMB according to an embodiment of the subject matter described herein. Referring to FIG. 5A, in step 500, write commands are retrieved from the host. As stated above, device controller 102 may read or retrieve write commands from the corresponding submission queue in host memory 301. In step 502, the write commands are classified. Write classifier 114 may classify the write commands in one or more categories, such as random, sequential, long, etc. In step 504, data specified by the write commands is retrieved from the host. Step 504 may be implemented by controller 102 reading the associated data from host memory 301 over bus 122. In step 506, the data retrieved is written to the aggregation queues in the host memory buffer. Steps 504 and 506 may be performed in parallel, as indicated above. In step 508, the coherency table is updated to reflect the LBA ranges for data stored in the HMB.

Figure 5B:
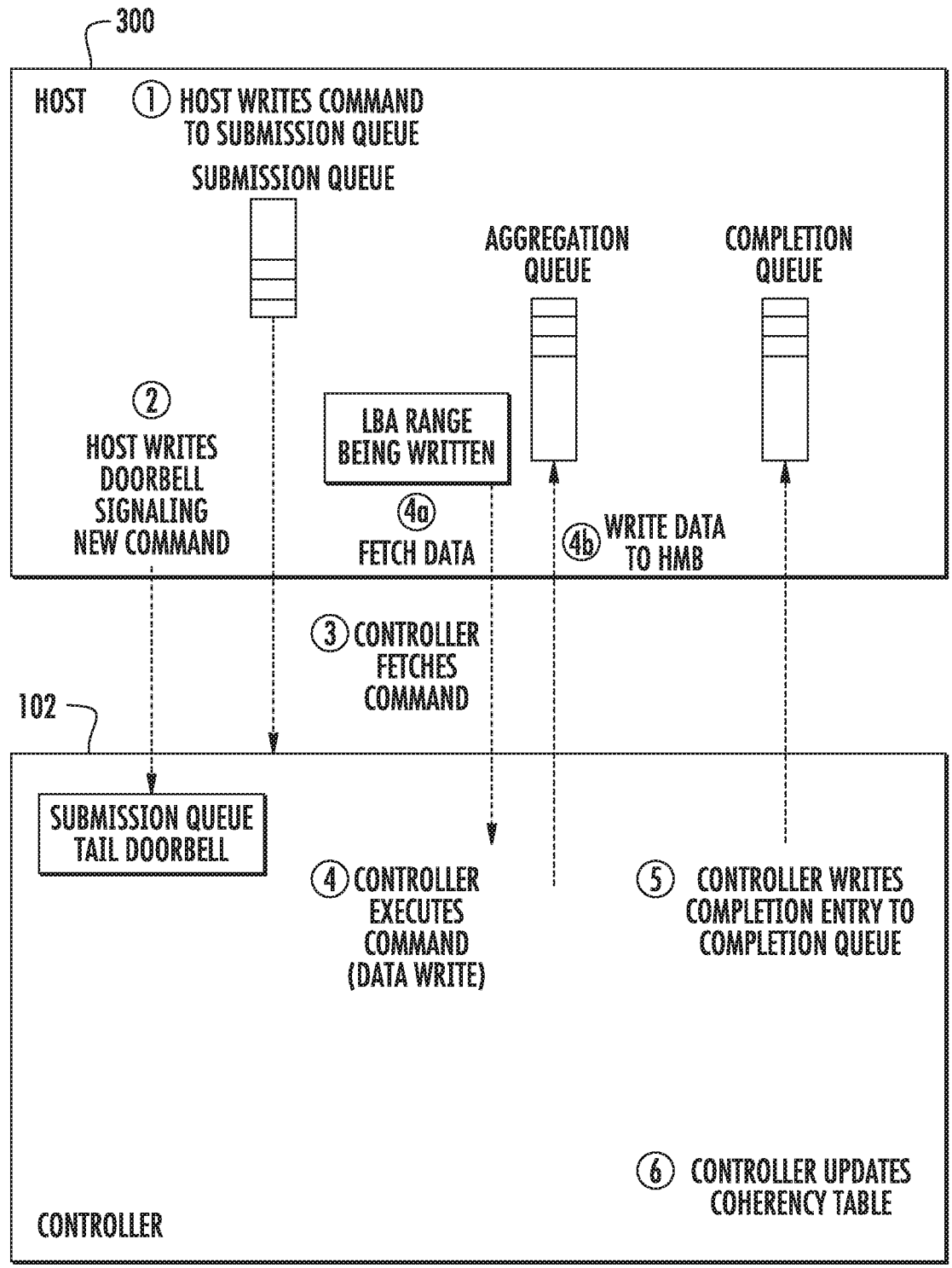
FIG. 5B is a block diagram illustrating exemplary operations performed by a host and a controller for a host write command where the data from the host write command is cached in the host memory buffer.

FIG. 5B illustrates exemplary messaging between controller 102 and host 300 for a host write operation where data from the write operation is cached in host memory buffer 302. Referring to FIG. 5B, in step 1, host 300 posts a command to a submission queue maintained in host memory. In step 2, host 300 writes to a submission queue tail doorbell register of controller 102 to signal controller 102 that a new command has been placed in the submission queue. In step 3, controller 102 fetches the command from the submission queue.

In step 4, controller 102 executes the command, which in this example is a host write command specifying data stored in a range of logical block addresses in host memory to be written to non-volatile memory 104. This data is cached in host memory buffer 302. Accordingly, in step 4a, controller 102 fetches the data corresponding to the LBA range from host memory. In step 4b, controller 102 writes the data to an aggregation queue in host memory buffer 302. In step 5, controller 102 writes an entry to a completion queue in host memory to indicate to host 300 that the write command has been completed. In step 6, the controller updates the coherency table to reflect the fact that the data for the LBA range specified in the write command is stored in host memory buffer 302.

Figure 6A:
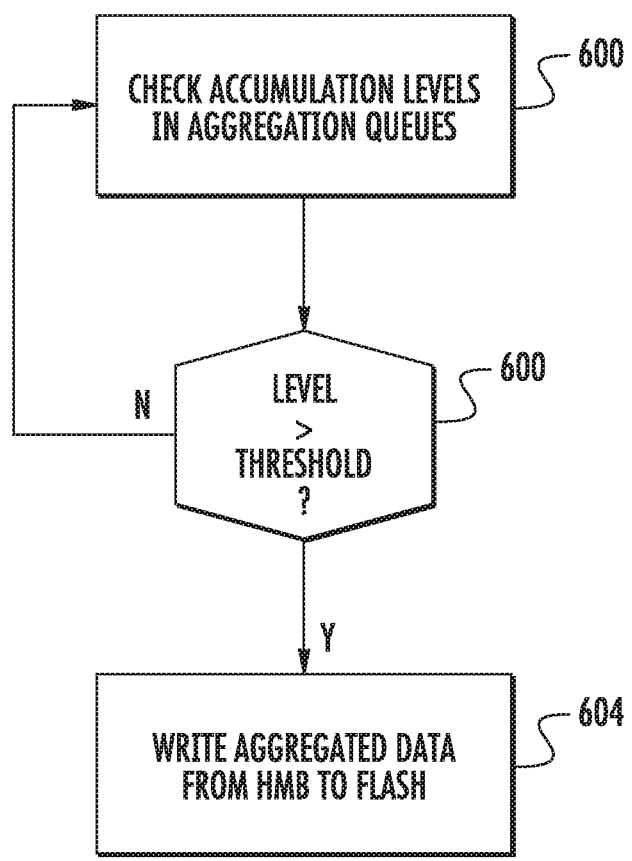
FIG. 6A is a flow chart illustrating an exemplary process for writing data from the host memory buffer to a flash memory device.

In parallel with the process illustrated in FIG. 5A, the aggregation queues in the HMB are monitored and periodically written to flash memory when enough data to fill one or more flash pages is accumulated. This process is illustrated in FIG. 6A. Referring to FIG. 6A, in step 600, data accumulation levels in the aggregation queues are checked. In step 602, it is determined whether a level in a particular queue exceeds a threshold, such as a page threshold. If the level is not greater than the threshold, device controller 102 continues the monitoring process. If the accumulation level achieves or exceeds a threshold, control proceeds to step 604 where the data is written from the HMB to the flash memory. The steps illustrated in FIG. 6A may be performed by controller 102 for each aggregation queue maintained in HMB 302.

Figure 6B:
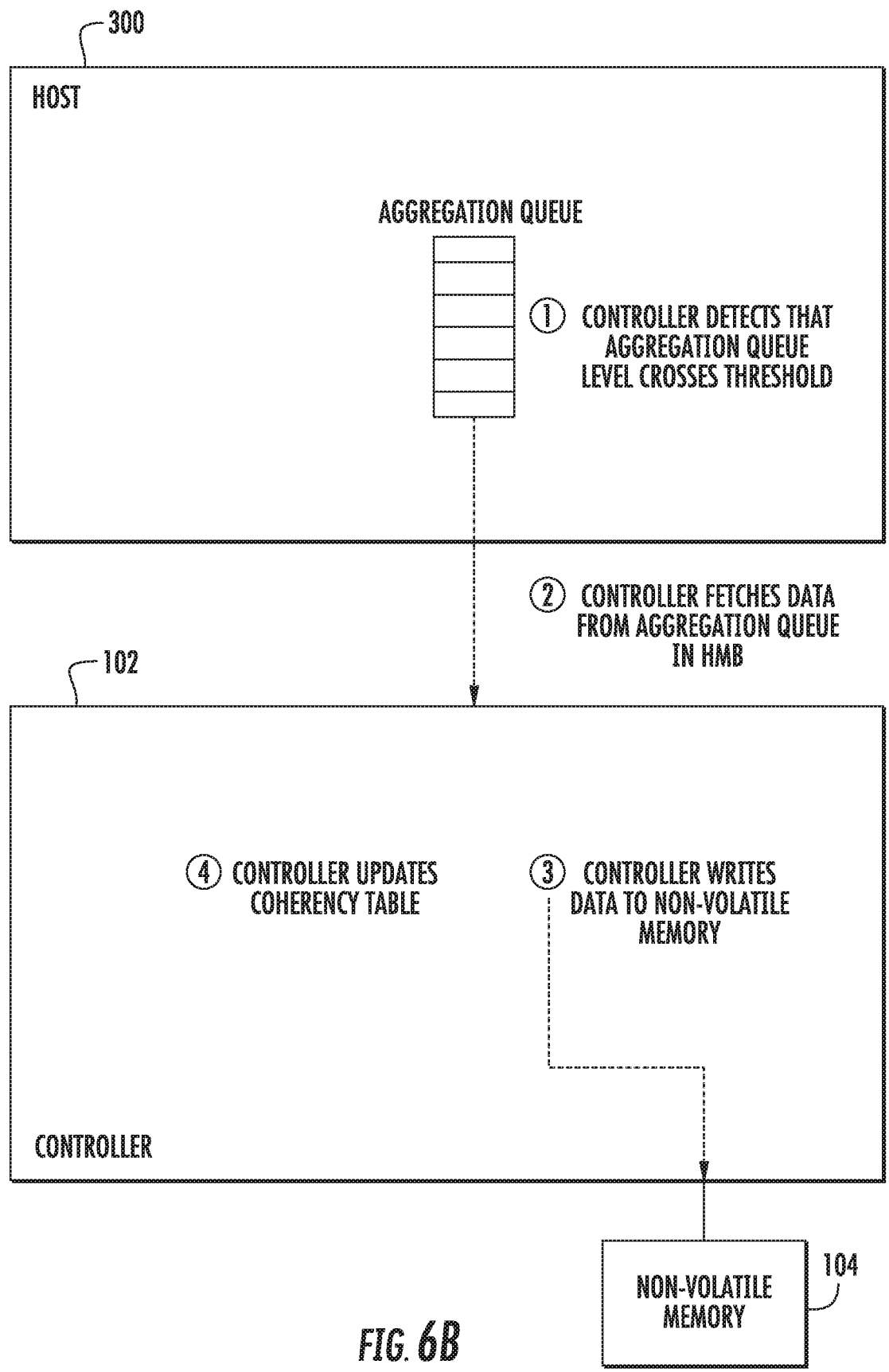
FIG. 6B is a block diagram illustrating exemplary operations performed by a controller when writing data from an aggregation queue in a host memory buffer to non-volatile memory in an attached non-volatile memory system.

FIG. 6B illustrates exemplary operations between host 300 and controller 102 when the amount of data in an aggregation queue passes a threshold level and is written to non-volatile memory. Referring to FIG. 6B, in step 1, controller 102 detects that the level of data in an aggregation queue maintained in host memory buffer 302 has crossed a threshold level. As described above, the threshold level may be an amount of data that corresponds to a page size of non-volatile memory 104. In step 2, controller 102 fetches the data from the aggregation queue in the host memory buffer. In the step 3, controller 102 writes the data to non-volatile memory 104. In step 4, controller 102 updates the coherency table to reflect that the data has been written from the aggregation queue to non-volatile memory 104.

Advantages

The following advantages may be achieved at least in part by the subject matter described herein. The efficiency of both the NVMe protocol and the flash device may be improved. One improvement is that NVMe write commands are completed extremely fast from a host perspective since the data is not written to the flash at the time that the command completion message is sent back to the host. Flash memory is more efficiently utilized than in implementations that use padding because only full pages are written from the HMB to the flash memory. Flash endurance is also improved since the number of write operations is reduced over implementations that pad and execute each write command to flash memory. The need for DRAM in the memory device is reduced by utilizing the HMB as the mechanism for caching the data for write operations.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

A method for write aggregation using a host memory buffer includes fetching write commands and data specified by the write commands from a host over a bus to a non-volatile memory system coupled to the host. Writing the data specified by the write commands from the non-volatile memory system over the bus to the host. The method further includes aggregating the data specified by the write commands in a host memory buffer maintained in memory of the host. The method further includes determining whether the data in the host memory buffer has aggregated to a threshold amount. The method further includes, in response to determining that the data has aggregated to the threshold amount, reading the data from the host memory buffer to the non-volatile memory system and writing the data to non-volatile memory in the non-volatile memory system.

A method for write aggregation using a host memory buffer includes caching data from host write operations in a host memory buffer accessible by a non-volatile memory system coupled to a host system via a bus. The method further includes determining whether an amount of data in the host memory buffer is greater than or equal to a threshold amount. The method further includes, in response to determining that the amount of data in the host memory buffer is greater than or equal to the threshold amount, fetching the data from the host memory buffer and writing the data to non-volatile memory of the non-volatile memory system.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for write aggregation using a host memory buffer, the method comprising:
   fetching, at a non-volatile memory system, write commands and data specified by the write commands from a host coupled via a bus to the non-volatile memory system, the write commands specifying data to be written to a non-volatile memory of the non-volatile memory system;
   writing the data specified by the write commands from the non-volatile memory system over the bus to a host memory buffer maintained in memory of the host, wherein the fetching of at least some of the data for a write command from the host is performed in parallel with the writing of at least some of the data for the same write command to the host memory buffer;
   aggregating the data specified by the write commands in the host memory buffer;
   determining whether the data in the host memory buffer has aggregated to a threshold amount; and
   in response to determining that the data has aggregated to the threshold amount, reading the data from the host memory buffer over the bus to the non-volatile memory system and writing the data to the non-volatile memory in the non-volatile memory system;
   wherein (a) transferring data from the non-volatile memory system to satisfy a host read command in parallel with fetching data from the host for a write command is prioritized over (b) fetching at least some of the data for the write command in parallel with writing at least some of the data for the same write command to the host memory buffer.

2. The method of claim 1, wherein:
   fetching the write commands from the host includes performing read operations using a fetching component; and
   writing the data specified by the write commands to the host memory buffer is performed using a separate direct memory access (DMA) controller.

3. The method of claim 1, further comprising classifying the write commands and wherein aggregating the data includes enqueuing the data in separate aggregation queues maintained in the host memory buffer according to classifications assigned to the write commands.

4. The method of claim 1, further comprising maintaining, by the non-volatile memory system, coherency data to track logical block addresses for the data written in the host memory buffer.

5. The method of claim 1, further comprising, in response to completion of transfer of all data for a write command to the host memory buffer, writing a completion entry to a completion queue in host memory, the completion entry written to the completion queue before the data is written to the non-volatile memory.

6. The method of claim 1, further comprising, at the non-volatile memory system, in response to receiving a read command from the host for which data is written in the host memory buffer, reading the data from the host memory buffer to satisfy the read command without transferring the data to the non-volatile memory system.

7. The method of claim 1, wherein the non-volatile memory system comprises a non-volatile storage device and wherein the non-volatile memory comprises flash memory.

8. The method of claim 1, wherein the bus comprises a peripheral component interconnect express (PCIe) bus and the write commands comprise non-volatile memory express (NVMe) write commands.

9. A method for write aggregation using a host memory buffer, the method comprising:
fetching, at a non-volatile memory system, write commands and data specified by the write commands from a host coupled via a bus to a non-volatile memory system, the write commands specifying data to be written to a non-volatile memory of the non-volatile memory system;
caching the data from the write commands via the bus in a host memory buffer maintained in memory of the host and accessible by the non-volatile memory system via the bus, wherein the fetching of at least some of the data for a write command from the host is performed in parallel with the caching of at least some of the data for the same write command in the host memory buffer;
determining whether an amount of the data cached in the host memory buffer is greater than or equal to a threshold amount; and
in response to determining that the amount of the data cached in the host memory buffer is greater than or equal to the threshold amount, fetching the data from the host memory buffer over the bus and writing the data to the non-volatile memory of the non-volatile memory system;
wherein (a) transferring data from the non-volatile memory system to satisfy a host read command in parallel with fetching data from the host for a write command is prioritized over (b) fetching at least some of the data for the write command in parallel with writing at least some of the data for the same write command to the host memory buffer.

10. The method of claim 9, wherein caching data from host write operations in the host memory buffer includes classifying the write commands into separate classes and caching the data from separate classes into separate aggregation queues in the host memory buffer.

11. The method of claim 10, wherein determining whether the amount of data is greater than or equal to the threshold amount includes determining whether the data cached in one of the aggregation queues is greater than or equal to a page size for the non-volatile memory.

12. The method of claim 11, wherein writing the data to the non-volatile memory includes writing a page of data from the one aggregation queue to the non-volatile memory.

13. The method of claim 9, further comprising, in response to completion of transfer of all data for a write command to the host memory buffer for caching therein, writing a completion entry to a completion queue in host memory, the completion entry written to the completion queue before the data is written to the non-volatile memory.

14. The method of claim 9, further comprising, in response to receiving a read command from the host for which data is cached in the host memory buffer, reading the data from the host memory buffer to satisfy the read command without transferring the data to the non-volatile memory system.

15. The method of claim 9, wherein the non-volatile memory system comprises a non-volatile storage device and wherein the non-volatile memory comprises flash memory.

16. An apparatus, comprising:
means for fetching, at a non-volatile memory system, write commands and data specified by the write commands from a host coupled via a bus to the non-volatile memory system, the write commands specifying data to be written to a non-volatile memory of the non-volatile memory system;
means for writing the data specified by the write commands from the non-volatile memory system over the bus to a host memory buffer maintained in memory of the host, wherein the means for writing is configured to write at least some of the data for a write command to the host memory buffer in parallel with the fetching of at least some data for the same write command from the host;
means for aggregating the data specified by the write commands in the host memory buffer;
means for determining whether the data in the host memory buffer has aggregated to a threshold amount;
means, operative in response to determining that the data has aggregated to the threshold amount, for reading the data from the host memory buffer over the bus to the non-volatile memory system and for writing the data to the non-volatile memory in the non-volatile memory system; and
means for prioritizing (a) transferring data from the non-volatile memory system to satisfy a host read command in parallel with fetching data from the host for a write command over (b) fetching at least some of the data for the write command in parallel with writing at least some of the data for the same write command to the host memory buffer.

17. A non-volatile memory system for use with a host, comprising:
a non-volatile memory; and
a controller coupled via a bus to the host and configured to
fetch write commands and data specified by the write commands from the host via the bus, the write commands specifying data to be written to the non-volatile memory;
write the data specified by the write commands from the non-volatile memory system over the bus to a host memory buffer maintained in memory of the host, wherein the fetching of at least some of the data for a write command from the host is performed in parallel with the writing of at least some of the data for the same write command to the host memory buffer;
aggregate the data specified by the write commands in the host memory buffer;
determine whether the data in the host memory buffer has aggregated to a threshold amount;
in response to determining that the data has aggregated to the threshold amount, read the data from the host memory buffer over the bus and write the data to the non-volatile memory; and
prioritize (a) transferring of data from the non-volatile memory system to satisfy a host read command in parallel with the fetching of data from the host for a write command over (b) fetching of data for a write command in parallel with the writing of data for the same write command to the host memory buffer.

* * * * *